United States Patent [19]

Matte

[11] 4,213,397
[45] Jul. 22, 1980

[54] MOTORCYCLE RAILWAY ATTACHMENT

[76] Inventor: Roger A. Matte, Zephyr, Ontario, Canada, L0E1T0

[21] Appl. No.: 942,543

[22] Filed: Sep. 15, 1978

[51] Int. Cl.² .............. B61D 15/00; B61D 15/12; B62H 1/12; B62K 13/00
[52] U.S. Cl. .................................. 105/95; 180/219
[58] Field of Search ................. 105/95; 180/219

[56] References Cited

U.S. PATENT DOCUMENTS

| | | | |
|---|---|---|---|
| 464,357 | 12/1891 | Gibson | 105/95 |
| 551,834 | 12/1895 | Parker | 105/95 |
| 575,337 | 1/1897 | Dehlin et al. | 105/95 |
| 615,237 | 12/1898 | Balser | 105/95 |
| 693,128 | 2/1902 | Gorneman | 105/95 |
| 876,058 | 1/1908 | Hovey | 105/95 X |
| 1,254,434 | 1/1918 | Rea | 105/95 |
| 1,436,532 | 11/1922 | Revny | 105/95 |
| 3,424,106 | 1/1969 | Scroggs et al. | 105/95 X |

*Primary Examiner*—Howard Beltran
*Attorney, Agent, or Firm*—Ridout & Maybee

[57] ABSTRACT

A portable railroad attachment for a motor bicycle comprises a trolley unit for supporting the bicycle and having a pair of track wheels engageable with a first rail of the track and a third wheel engageable with the other rail. The trolley unit is detachably secured to the bicycle frame by a swivel coupling which provides a pivotal support about which the bicycle is pivoted under the weight of a rider to bring the driven wheel of the bicycle into tractional engagement with the first track rail.

9 Claims, 5 Drawing Figures

MOTORCYCLE RAILWAY ATTACHMENT

This invention relates to a portable railroad attachment for a bicycle, more particularly a motor bicycle, of the type primarily intended for the transportation of personnel, equipment and materials for rail inspection, maintenance and repair.

It is an object of the invention to provide, in combination with an ordinary bicycle adapted for use on roads in the conventional manner, a readily detachable portable unit for converting the bicycle for use on railroad tracks, the driven wheel of the bicycle being engageable with one of the rails only when the rider is seated on the bicycle.

A portable railroad attachment in accordance with the invention comprises a trolley unit, means for detachably securing the trolley unit to the frame of the bicycle, a pair of longitudinally aligned track wheels on the trolley unit engageable with a first rail of a railroad track, a third track wheel on the trolley unit supported in laterally spaced relation to said pair of track wheels for engagement with the other rail, guide means on the trolley unit for locating the driven wheel of the bicycle in longitudinal alignment with said pair of track wheels, support means on the trolley unit for supporting the other wheel of the bicycle out of engagement with the first track rail, and pivotal support means engageable with the bicycle frame at an intermediate position between the road wheels of the bicycle, the pivotal support means defining a fulcrum about which the bicycle is pivoted under the weight of a rider to bring the driven road wheel of the bicycle into tractional engagement with said first track rail.

That the driven wheel should be brought into tractional engagement with the track rail only under the weight of a rider is an important safety feature of the invention, particularly in the case of a motor bicycle. The pivotal support means is preferably a swivel coupling the respective members of which are rigidly and transversely secured in coaxial alignment on the bicycle frame and the trolley unit, there being provided means for releasably locking the coupling members in coupled relationship.

One embodiment of the invention will now be described, by way of example, with reference to the accompanying drawings, in which.

Figure 3:
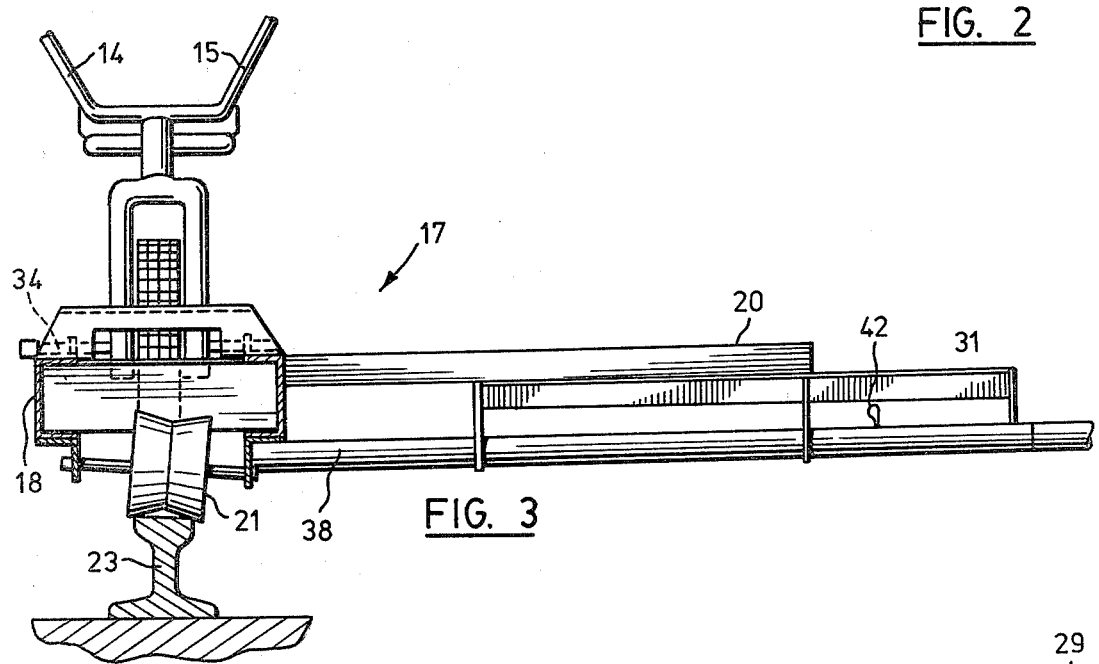
FIG. 3 is a section on line 3—3 in FIG. 1.

Referring to the drawings, there is shown a conventional motor bicycle 10 having a frame 11, a front wheel 12 and a driven rear wheel 13. The lower part of the frame 11 is bifurcated providing a pair of sloping fork members 14, 15. A rider's seat 16 is mounted on the frame. A portable attachment for the bicycle comprises a trolley unit 17, which is detachably secured to the bicycle frame 11 as hereinafter described. The trolley unit consists of an elongated body 18 providing a support platform and horizontal tray 20 welded to and extending laterally from the body 18. The body 18 and tray 20 are preferably constructed of sheet aluminum for lightness. The elongated body 18 has a pair of longitudinally aligned flanged track wheels 21, 22 which are engageable with a first rail 23 of the railroad track, the wheels being cambered slightly inwards as shown in FIG. 3. The platform of the body 18 includes a front pocket providing a support plate 24 which normally engages the front wheel 12 of the bicycle to support the front wheel clear of the track rail 23. The platform also includes a rear pocket for receiving the driven rear wheel 13 of the bicycle, this pocket providing an aperture through which the rear wheel 13 may extend to engage the track rail 23. Associated with the rear pocket is a guide constituted by a pair of longitudinally extending angle members 25, 26, which serve to locate the rear wheel 13 in longitudinal alignment with the front and rear track wheels 21, 22 of the trolley unit.

Figure 5:
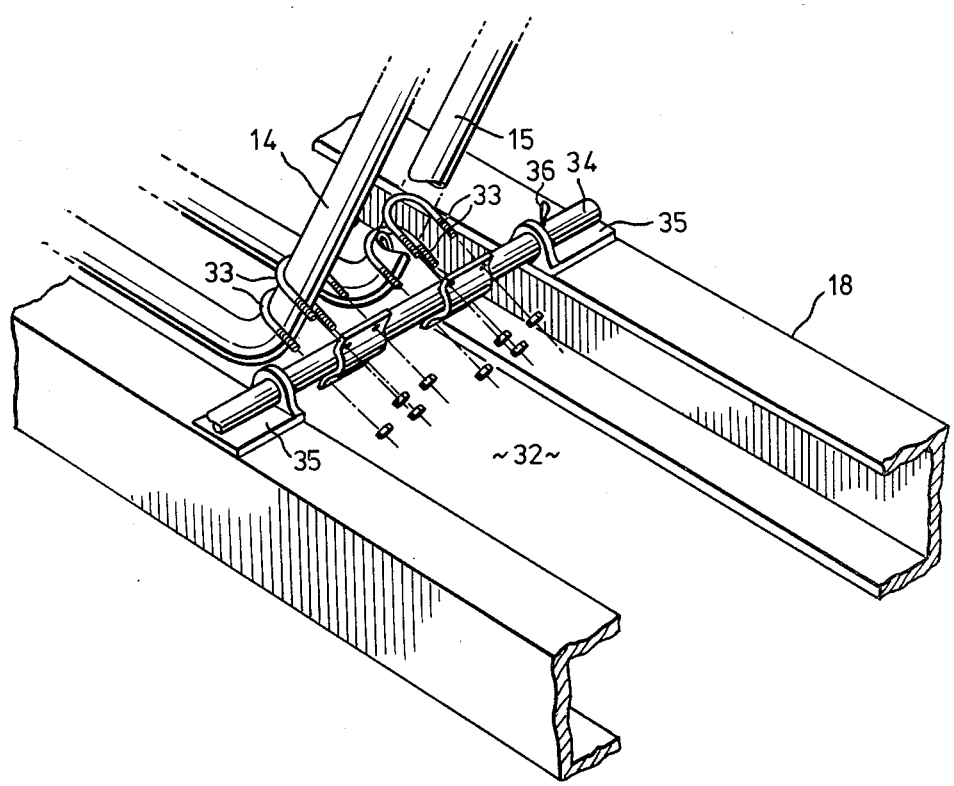
FIG. 5 is an exploded view of a detail of the structure viewed in the direction of arrow 5 in FIG. 1

The trolley unit 17 has a third track wheel 27 supported in laterally spaced relation to the track wheels 21, 22 for engagement with the other rail 28 of the railroad track. Unlike the track wheels 21, 22, the third track wheel 27 is not flanged but has a rubber tread 29. The track wheel 27 is mounted on an axle 30 extending beneath the horizontal tray 20, the axle providing with a pair of angle beams 31 secured to the underside of the tray 20 a support for the tray. The third track wheel 27 and the axle 30 constitute a separate detachable unit which can be housed in an interior compartment 32 (FIG. 5) of the elongated body 18 when not in use.

Figure 1:
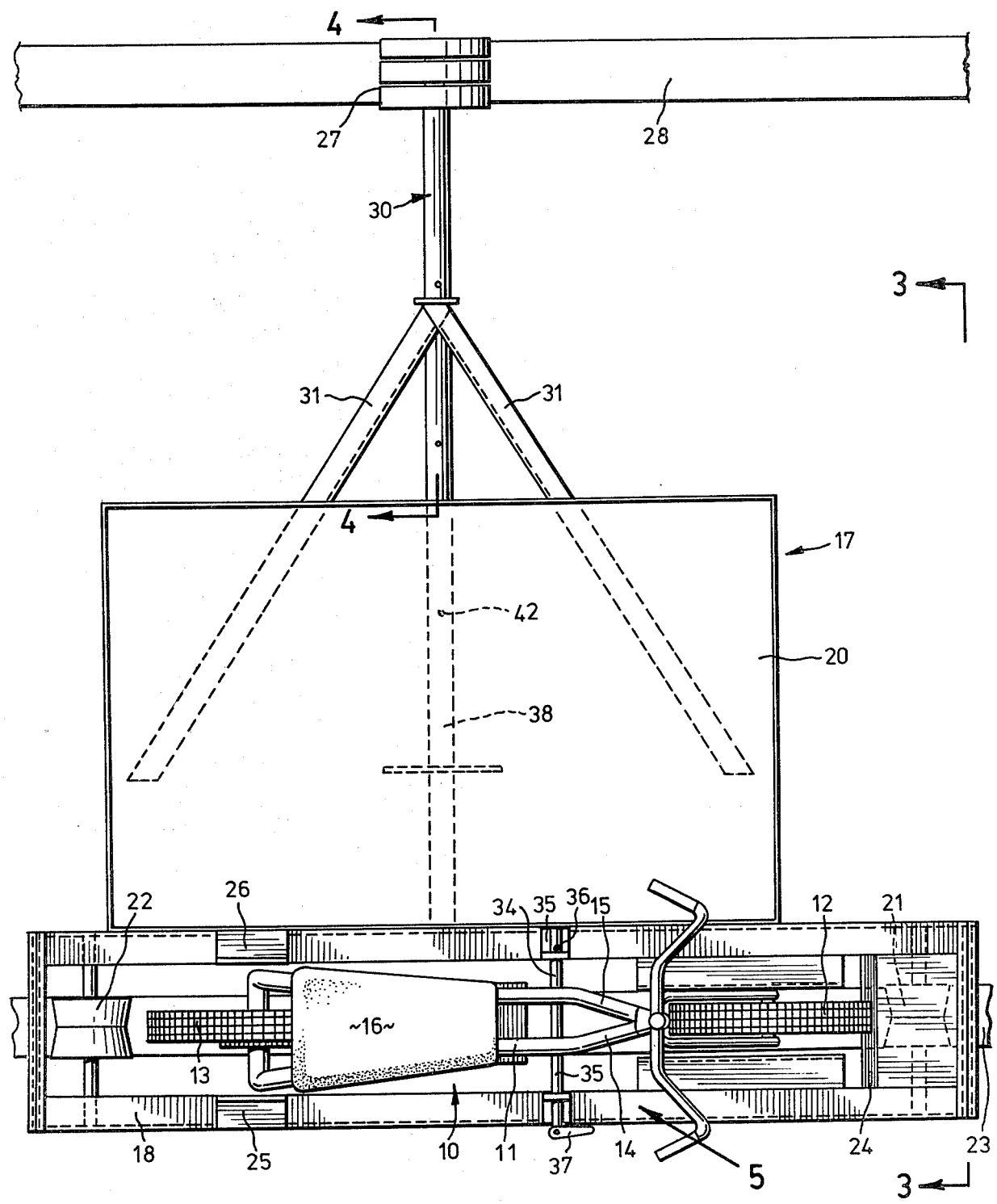
FIG. 1 is a top plan view of an assembled motor bicycle and railroad attachment in accordance with the invention.
Figure 2:
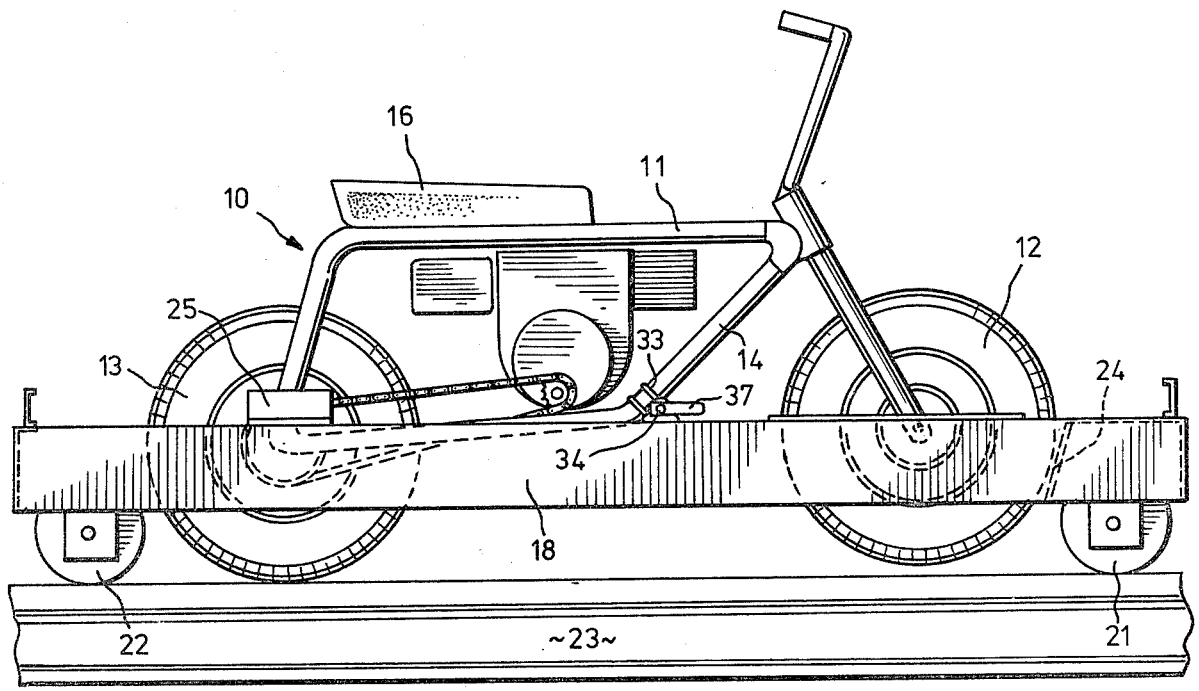
FIG. 2 is a side elevational view of the motor bicycle and trolley unit on which it is supported.

For detachably securing the trolley unit to the bicycle frame a pair of U-clamps 33 bolted to the fork arms 14, 15 of the bicycle frame rigidly support a pivot pin 34, the ends of the pivot pin being retained by bearing blocks 35 mounted on the side members of the body 18. The pivot pin is thus secured to the bicycle frame at an intermediate position between the front and rear road wheels of the bicycle, providing a horizontal pivotal support which supports the bicycle so that the rear wheel is normally disengaged from the track rail 23, and about which the bicycle is pivotally moved under the weight of a rider seated on the seat 16 to bring the driven rear wheel into tractional engagement with the rail 23. FIG. 2 shows the bicycle in the latter position, the rear wheel 13 engaging the track rail 23 and the front wheel being lifted slightly from the support plate 24. A locking pin 36 at one end of the pivot pin 34 serves to prevent accidental withdrawal of the pivot pin from the bearing blocks. A folding foot rest 37 at the other end assists in withdrawing the pivot pin 34 when required.

Figure 4:
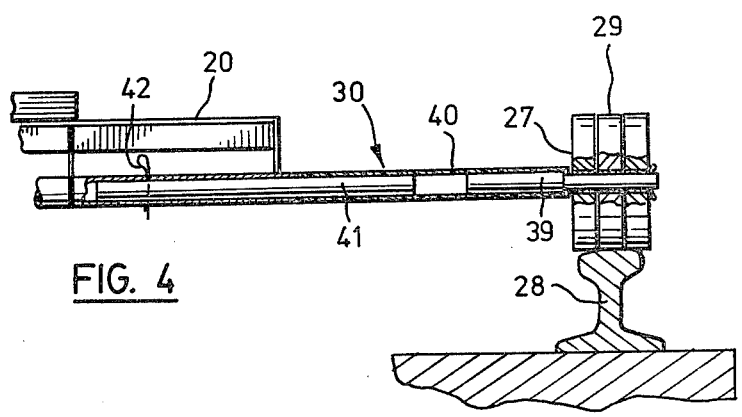
FIG. 4 is a section on line 4—4 in FIG. 1.

A tubular member 38 is connected in a conventional manner, as by welding or bolting, to the side of the body 18, and extends laterally from the body 18 to form an outrigger axle for the third track wheel 27. The tubular member 38 also supports the angle beams 31. The axle 30 of the third track wheel 27 comprises essentially a stub axle 39, a sleeve 40 of insulating material, and an axle extension 41. The third track wheel 27 is supported on the stub axle 39, which fits tightly into the sleeve 40. The axle extension 41, which is also a tight fit in the tubular sleeve 40, protrudes from the opposite end of the sleeve, and as shown in FIG. 4 there is a gap between the ends of the stub axle and the axle extension. The whole axle assembly 30 slides into the tubular member 38 and is prevented from moving axially by means of a locking pin 42.

What I claim is:

1. In combination with a bicycle having a frame with a pair of road wheels including one driven wheel and a rider's seat, a portable railroad attachment therefor comprising:
- a trolley unit,
- means for detachably securing the trolley unit to the bicycle frame,
- a pair of longitudinally aligned track wheels on the trolley unit engageable with a first rail of a railroad track,
- a third track wheel on the trolley unit supported in laterally spaced relation to said pair of track wheels for engagement with the other rail,
- guide means on the trolley unit for locating said driven wheel in longitudinal alignment with said pair of track wheels,
- support means on the trolley unit for supporting the other road wheel of the bicycle out of engagement with said first track rail, and
- pivotal support means on said trolley unit engageable with the bicycle frame at an intermediate position between said road wheels, forwardly of said rider's seat, and at an elevation to hold both said road wheels out of tractive engagement with said first rail, said pivotal support means defining a fulcrum about which the bicycle is pivoted relative to said trolley unit under the weight of a rider on said seat to bring said driven road wheel into tractional engagement with said first track rail.

2. The combination claimed in claim 1, said driven wheel being the rear wheel of the bicycle.

3. The combination claimed in claim 1, the bicycle being a motor bicycle.

4. The combination claimed in claim 3, wherein said pivotal support means constitutes means for detachably securing the trolley unit to the bicycle frame comprises a transverse member rigidly secured to the bicycle frame at said intermediate position, bearing means on the trolley unit engaging the ends of the transverse member, and means for retaining said transverse member, the transverse member and bearing means when mutually engaged defining said pivotal support means.

5. In combination with a motor bicycle adapted for road use, the bicycle having a frame with a pair of road wheels including a driven rear wheel and a rider's seat, a portable railroad attachment therefor comprising:
- a trolley unit,
- means for detachably securing the trolley unit to the bicycle frame,
- a pair of longitudinally aligned flanged track wheels on the trolley unit engageable with a first rail of a railroad track,
- a third track wheel on the trolley unit supported in laterally spaced relation to said pair of track wheels for engagement with the other rail,
- guide means on the trolley unit for locating said driven rear wheel in longitudinal alignment with said pair of track wheels, and
- support means on the trolley unit for supporting the front road wheel of the bicycle out of engagement with said first track rail,
- said detachable securing means comprising a pivotal coupling between said bicycle and trolley unit the respective members of which are rigidly and transversely secured in coaxial alignment on the bicycle frame at an intermediate position between said road wheels, forwardly of said rider's seat and on the trolley unit at an elevation to hold both said road wheels out of tractive engagement with said first rail, and means for releasably locking said members in coupled relationship, said coupling defining a horizontal pivotal support about which the bicycle is pivotally movable relative to said trolley unit under the weight of a rider on said seat to bring the driven road wheel into tractional engagement with said first rail.

6. The combination claimed in claim 5, wherein the trolley unit includes an elongated body supported adjacent its ends by said pair of track wheels, the body providing a platform on which said guide means and said support means are mounted in longitudinally spaced relation, the platform having an aperture adjacent said guide means for receiving the rear road wheel of the bicycle, said rear road wheel being engageable with the track rail through said aperture.

7. The combination claimed in claim 6, wherein the trolley unit includes a horizontal tray secured to and extending laterally from the elongated body towards said third track wheel, said third track wheel being mounted on an axle extending beneath the tray and supporting the tray.

8. The combination claimed in claim 7, wherein the third track wheel has a rubber tread.

9. The combination claimed in claim 7, wherein the third track wheel and axle constitute a separate detachable unit, the elongated body providing an interior compartment for housing the unit.

* * * * *